United States Patent [19]

Eisenmenger et al.

[11] 4,038,224

[45] July 26, 1977

[54] ORGANICALLY MODIFIED SILICIC ACIDS AND SILICATES FOR DELUSTERING LACQUERS

[75] Inventors: Edith Eisenmenger, Offenbach (Main); Otto Kühnert, Beuel; Robert Kuhlmann, Keldenich; Peter Nauroth, Wesseling; Günter Türk, Grossauheim, all of Germany

[73] Assignee: Deutsche Gold- und Silber-Scheideanstalt vormals Roessler, Frankfurt am Main, Germany

[21] Appl. No.: 673,555

[22] Filed: Apr. 5, 1976

Related U.S. Application Data

[63] Continuation-in-part of Ser. No. 567,203, April 11, 1975, abandoned, which is a continuation of Ser. No. 113,635, Feb. 8, 1971, abandoned, which is a continuation of Ser. No. 765,683, Oct. 7, 1968, Pat. No. 3,607,337.

[51] Int. Cl.² .................... C08L 1/12; C08K 3/36; C09C 1/30

[52] U.S. Cl. .................. 260/15 R; 106/270; 106/271; 106/308 Q; 260/17 R; 260/33.4 R; 428/220

[58] Field of Search ............... 106/272, 271; 427/170; 260/37 SB, 15, 17

[56] References Cited

U.S. PATENT DOCUMENTS

| 2,204,981 | 6/1940 | Clough | 106/192 |
|---|---|---|---|
| 2,838,413 | 6/1958 | Young | 106/272 |
| 3,453,127 | 7/1969 | Marotta | 106/192 |
| 3,607,337 | 9/1971 | Eisenmenger | 106/272 |
| 3,816,154 | 6/1974 | Baldyga | 106/272 |

*Primary Examiner*—Theodore Morris
*Attorney, Agent, or Firm*—Beveridge, DeGrandi, Kline

[57] ABSTRACT

Modified silicic acids, gels, and silicates are produced by impregnation with a wax or a thermoplastic material, such as polyethylene. The silicic acids, silica gels, or silicates can be impregnated either as they are being formed or after they have formed by adding an aqueous suspension or dispersion of wax thermoplastic material to the silicic acids, gels or silicates. The mixture is then filtered, washed, dried, and finely ground. The organically modified silicic acids, gels, and silicates are useful as delustering agents in lacquer systems.

4 Claims, No Drawings

ORGANICALLY MODIFIED SILICIC ACIDS AND SILICATES FOR DELUSTERING LACQUERS

REFERENCE TO RELATED PATENT APPLICATIONS

This application is a continuation-in-part of copending application Ser. No. 567,203 filed Apr. 11, 1975 which in turn is a continuation of application Ser. No. 113,635 filed Feb. 8, 1971 both now abandoned which in turn is a continuation of application Ser. No. 765,683 filed Oct. 7, 1968 U.S. Pat. No. 3,607,337.

BACKGROUND OF THE INVENTION

The invention relates to a process for the production of organically modified precipitated silicic acids and silicates which are suitable particularly for delustering films of lacquers.

It has been known to use synthetic silicon dioxide containing substances as dulling agents in lacquer systems. The silicic acids present in such lacquer systems—and that pertains equally to xerogels and aerogels—very often tend to settle at the bottom of the lacquer and, upon prolonged storage, form a hard deposit, which can be distributed only with the greatest difficulty or not at all in the lacquer through simple stirring. The tendency to form hard deposits at the bottom of the lacquers is particularly marked when the lacquers contain polar solvent components, such as the lower alcohols.

There have been many attempts to improve the behavior of silicic acids in lacquers and to minimize the tendency to form deposits. Included among these are the impregnation of silicic gels with inorganic fluorides and complex fluorides, with $C_1-C_5$ alcohols and with organic silicates (ester of the ortho silicic acid), and, finally, with a microcrystalline, inert petroleum wax. In the latter case, a precipitated silicic acid gel or a hydrogel is coated with a fusible wax, whereby the coated silicic acid has a relatively high content of wax of 15 - 30% by weight, which is necessary for the achievement of a favorable deposit behavior. To maintain the strength and hardness of the films of lacquer, as little was as possible should be put into the silicic acid.

The above-mentioned treatments for an improvement of the deposit behavior of silicic acids in lacquers through their impregnation with fluorides and organic silicates, leads to improvements in the redispersibility of the deposits on the bottom of the lacquer containers. All of the silicic gels impregnated with wax in practically all known lacquer systems can be dispersed smoothly in the lacquer without difficulties through simple agitating or stirring.

However, the dulling effect on a lacquer of a silica gel impregnated with wax in such a manner is clearly decreased in comparison with other commercial dulling silicic acids. Another disadvantage of such wax-impregnated gels is the low resistance to scratching imparted to the films of dulled lacquer. This undesirable property is due to the relatively high content (15 - 30% by weight) of natural wax present in the lacquer films. Furthermore, such films of lacquer very soon become lustrous through mechanical wear.

While the wax impregnated silicic acids do show a certain fineness in particle size, they no longer satisfy the requirements of modern lacquer and pigment technology and its increasing demands with respect to lacquered surfaces, especially for surfaces coated with relatively thin films of pigmented lacquer.

It is possible with the use of modern techniques, such as micronizing, to produce silicic acid of a very fine particle size. However, experience has shown that with an increase in the fineness of the silicic acid, the quality of the lacquer surface improves but the capacity for dulling by the silicic acid clearly decreases. At the same time, the thickening effect which is undesirable and which can be the cause for breakdowns when the lacquer is sprayed, increases greatly.

The invention started with the task of finding a process for the production of organically modified, precipitated silicic acids and silicates through impregnation of the silicic acids and silicates with waxes or plastics to form products with improved dulling and deposit properties in clear varnishes (lacquers) or pigmented lacquers of all kinds. Such wax-impregnated compounds can be dispersed in the lacquers through simple stirring with a high speed mixer and remain suspended in the above-mentioned lacquers even during prolonged storage, or can be redispersed in the lacquer without difficulty in the event some of them do settle or deposit after storage.

The characterizing part of the invention is to be seen in the fact that during and/or after precipitation of silica gels or silicic acid or silicates from alkali silicate solutions in the presence of acids or metal salts, an aqueous emulsion of an inert, colorless, high-melting wax or plastic is added, and the mixture is subsequently filtered, the filter cake is washed, dried, and finely ground.

According to the invention, the impregnation of the silicic acid or silicates can take place either by addition of the wax emulsion during the precipitation process or, after the precipitation of the silicic acid or silicates, by adding the proper quantity of a wax emulsion to the precipitation emulsion. It is also possible to add a part of the wax emulsion during, and another part after precipitation of the silicic acid or silicates.

Furthermore, one can subject a salt-free dough of silicic acid, or a dried, finely dispersed silicic acid or silicate dispersed in water, to an after treatment, by treating them additionally with an aqueous wax emulsion and precipitating the emulsified compound onto the precipitated substance by suitable measures, such as change of temperature or of the pH value of the suspension.

The addition of the wax emulsion to the precipitation suspension of the silicic acid or silicate, or to the redispersed silicic acid or silicate is not limited to a special type of precipitated silica or silicate precipitated under certain precipitation conditions (pH value, temperature, $SiO_2$ concentrations and precipitation speed). Basically, through the process according to the invention, a wide range of types of silicic gel or silicic acid, or silicate suspension can be impregnated with wax in suspension as a result of which the deposit behavior of the modified silicic acid or silicates in lacquers, as well as the resistance to scratching of the films of lacquers, is considerably improved as compared to other commercial, wax-modified dulling silicic acids.

It will be understood that the terms "precipitated silicic acids or silicates" include such substances that are formed directly by precipitation from alkali silicate solutions, i.e. preferably water glass and mineral acids or metal salt solutions. In this manner one can very easily obtain powdery, soft, and quickly dispersible dulling agents.

SUMMARY OF THE INVENTION

It has been determined that when the amount of wax to be combined with the silicic acid, silica gel or silicate granuals is in the range of 2 to 7% by weight, desirable results are obtained in accordance with the teachings of this invention regarding the production of a delustering product with the above-mentioned characteristics.

The delustering products, produced according to the invention are distinguished, in comparison to commercial products known heretofore, by a qualitatively particularly good surface of the dulled layers of lacquer, which can be traced back to the comparatively greater fineness of the products. The modified silicic acids or silicates, obtainable according to the method of the invention show, in comparison with known commercial, wax containing silicic acids, surprisingly no particular thickening effect on the lacquers, despite their fine grain size which has a favorable effect on the course of the dull lacquer during spraying.

The capability for very fine dispersion of the dulling products of the invention permits spraying of lacquers to form thinner films. This is particularly desirable in the case of dull-clear varnishes used in the furniture industry. Thinner films of lacquer deluster better, as a rule, than thicker ones, which leads or can lead, to an additional increase of the dulling power. For the production of dull-clear varnishes, one would use the modified silicic acid because of the transparency which is required, whereas, because of their decreased transparency characteristics, modified silicates are used for pigmented dull lacquers.

According to the invention, the process can also be carried out with an aqueous dispersion of a plastic material which can be used instead of the above wax emulsion for the impregnation of the silica gels or silicic acids and silicates. Through treatment with such synthetic lacquer dispersions, one can likewise produce modified products with good deposit behavior. The only requirement is that the plastic material be completely inert in the water or the lacquer systems, that it be insoluble in water, and finally, that it be so fine, about 7 to 10 microns or less, that it can be put into a stable dispersion form. For example, finely dispersed polyethylene can be changed into a stable dispersion form without trouble in the presence of surface active substances and can be used for the purposes of the invention. The process if not limited to this plastic material or synthetic substance; polyvinylchloride, Teflon (polytetrafluoroethylene), and other thermoplastic compounds also can be used in the dispersed form. In general the above mentioned synthetic thermoplastic polymers are representation of the class of materials that may be used for purposes of this invention.

One will obtain particularly favorable products by furthering the impregnation of silicic acid or silicates as they are being precipitated, or after they are precipitated, with a wax emulsion or dispersion of a synthetic substance, through an intensive mixing process. Machine devices which are suitable for carrying out such a step in the process, such as dispergators, are frequently used in chemical engineering. Recently, such dispergators have become available as continuously operating machines with high feed performance, so that it will be possible to continuously and very intensively mix any desired silicic acid or silicate suspension with the wax emulsion or dispersion of a synthetic substance.

Beside this advantageous homogenization, one will achieve by the use of dispergators an extremely intensive comminution and division of the silicic acid or silicate agglomerates, formed during the precipitation. This type of wet comminution, which can be controlled selectively through a suitable selection of the ratio of suspension volume and feed performance of the dispersing installation as well as of the dispersion time, influences the quality of the surfaces of the films of lacquer. The products obtainable in this manner, after being ground up, are distinguished by a very high degree of fineness, which is the precondition for the high quality of the surface of the lacquer. Illustratively, the Bahco analysis is 69.4% by weight $<2.3\ \mu$, 96.3% by weight $<3.6\ \mu$, 99% by weight $<7.4\ \mu$; cf Information Service Work Community for Pharmaceutical Engineering 12.1/2: 69–71(1966). On the basis of the high degree of fineness which such dulling silicic acids or silicates have, certain types of lacquer can be sprayed on in considerably thinner films than hitherto (up to 30 $\mu$ and smaller), without the formation of any spots becoming apparent on the surface of the lacquer. Surprisingly, no noteworthy increase in thickening parallels the high degree of dispersion of the dulling silicic acid or silicates; one can even achieve an additional dulling effect by using thin films of lacquer. A substantial portion of the dulling agents of the invention are less than about 10 microns in size.

For the process according to the invention, in principle all emulsifiable, colorless, chemically inert waxes, such as natural waxes of animal or vegetable origin, such as mineral waxes, as well as synthetic waxes can be used. Preferably, such waxes are chosen which are distinguished by insolubility in lacquer solvents, a high melting point of more than 85° C. (hard waxes), a refractive index close to 1.50, and a relatively high decomposition temperature in the air (about 150° C). With the exception of the emulsifying capacity, synthetic substances too are to be used, which in the dispersed form have these characteristics The products according to the invention, can also be used as fillers in the most varied areas, beside their suitability as dulling agents

DETAILED DESCRIPTION OF THE INVENTION

The invention will be explained in more detail by way of the following examples, but is not limited by them:

EXAMPLE 1

For the manufacture of a silicic acid suitable for modification, 115 liters of water and 6 liters of water glass, mole ratio $Na_2O:SiO_2 = 1:3.3$, density 1.063, are placed in a 1000 liter vessel and heated to 80° C. through introduction of steam.

Then 460 liters of water glass, density 1.063, and about 160 liters of sulphuric acid, density 1.058, are fed in at opposite points simultaneously, while stirring the mixture with a flat paddle mixer for 100 minutes. The temperature is kept at 80° C. through regulation of steam supply. Furthermore, a pH value of about 10 is maintained in the suspension through regulation of the acid supply during the entire precipitation.

After the reaction liquids have been put in, the pH value of the suspenion is adjusted to about 2.5 through adding a small quantity of sulphuric acid.

A highly fluid, transparent, white suspension with a solids content of about 45 g/l is obtained.

For covering the precipitate with about 2% of wax, the following mixture is prepared:

0.65 kg. of emulsifiable wax on a polyethylene base (OA wax made by BASF) is melted together with 0.13 kg. of watersoluble noniogeneous derivative of a fatty alcohol (Emulphor O.C. of BASF) at 115° to 120° C. The melt is emulsified in a thin ray or stream into 6 liters of water at 96° while stirring rapidly with the turbine. BASF refers to Badische Anilin & Soda-Fabrik A.G.

The emulsion which forms is introduced into the silicic acid mixture while stirring and after cooling. The stirring is continued for about 30 minutes. Afterwards, the mixture is filtered off in the customary manner via a filter press. The drying of the pressed dough is accomplished in a belt dried at a recirculated air temperature of about 105° C.

A white granulate is obtained which can easily be crushed into a fine powder. The product is ground in a suitable mill into a fine powder.

For testing the lacquer engineering properties, the following acid-hardening lacquer mixture is used:

| Parts by Weight | Ingredient |
| --- | --- |
| 39.6 | Plastopol BT, 60% butanol (urea-formaldehyde condensate) |
| 30.2 | xylene |
| 15.1 | ethylene glycol |
| 15.1 | ethanol |

2 g. of silicic acid dulling agent are stirred in with a dissolver into 40 g. of the above mixture and are worked for another 8 minutes.

The lacquer is filled into a closable glass flasks for observation of sedimentation behavior. After a standing time of 8 weeks, the lacquer showed no deposit whatever on the bottom.

A commercial silicic acid, coated with about 15% hard paraffin and used as a comparison, on the other hand, formed in the same lacquer after the same storage time a deposit of 30 ml/100 ml. lacquer.

In order to evaluate the delustering effect, the above mentioned lacquer is treated with 14 percent of 10% alcoholic HCl solution and is sprayed in the known manner onto primed wooden boards.

The degree of lustre of the hardened film of lacquer is determined according to Lange. The intensity of the reflected light is measured, whereby the reflected share of a ray of light striking the lacquer coating at a 45° angle is determined photoelectrically. The degree of lustre in the case of the silicic acid made according to the invention amounted to 7%. The commercial dulling agent on the other hand had a degree of lustre of 10%.

The dulling agent produced according to the invention was clearly superior to the commercial agents with regard to scratch resistance.

EXAMPLE 2

A silicic acid produced according to Example 1 was covered in the described manner through addition of a fairly large quantity of emulsion with 5% polyethylene wax. After filtering and drying, soft, uniformly pale yellow colored pieces were obtained. These were ground fine in a suitable grinder.

A test of the dulling agent was this time accomplished with the following nitro combination lacquer:

| Parts by Weight | Ingredient |
| --- | --- |
| 15 | Collodion cotton (E 510) moist with butanol |
| 10 | Alresat 291C (maleic resin) |
| 10 | Jaegalyd E42, 60% in xylene (peanut-alkyd resin) |
| 3 | Dibutyl phthalate |
| 2 | Castor oil |
| 15 | Ethyl acetate |
| 15 | Butyl acetate |
| 15 | Toluene |
| 15 | Butanol |
| 10 | Benzene 100/14° C. |

2 parts by weight of a dulling agent were worked into this mixture by means of a propeller stirrer rotating at 2000 rpm.

After a storage time of 3 weeks the lacquer had no sediment. Only after a storage time of about 6 weeks did a deposit develop on the bottom, and this was easily dispersed by stirring. The commercial dulling agent on the other hand formed a sediment of 25 ml. sediment/100 ml. of lacquer after 3 weeks.

The film made with this lacquer using the silicic acid according to the invention was completely free of spots and extremely scratch resistant. It has a degree of lustre of 8%. The film of lacquer made with the comparison product was softer and less scratch-resistant. It only had a degree of lustre of 14%.

EXAMPLE 3

4.2 liters of water are placed in a closed stirrer with 30-liter capacity, provided with a reflux cooler, made of acidresistant steel. This is heated indirectly to 60° C. with a gas burner, and is kept at this temperature during precipitation. Then a solution of water glass, thinned down to 13% by weight of $SiO_2$ content (mole ratio 1:3.36) is added and, as soon as a pH value of 12 has been reached in the initial mix, an aluminum sulphate solution with 1.4% by weight of $Al_2O_3$ content is permitted to run in at a place opposite to the place of entry of the silicate solution. The solutions reacting one with another are measured by means of a flow meter in such a manner that 12.6 liters of silicate solution and 11.6 liters of aluminum sulphate solution are added in 100 minutes. The suspension is stirred with a flat paddle stirrer (diameter 20 cm., height 5 cm. rotating at 50 to 70 rpm). During the precipitation, a pH value of about 12 is maintained in the medium through regulation of the influx speed of the aluminum sulphate solution. After 100 minutes the precipitation is completed.

A wax emulsion is produced by allowing 210 g. of melted hard paraffin to run into 1 liter of water at 90° C. to which is added, as an emulsifier, 5 g. of cetyltrimethylammonium bromide, and 25 g. of a silicic acid, precipitated according to Example 1, is added.

The finished emulsion is placed into the aluminum silicate suspension while stirring. Then the suspension is adjusted to about pH 4 through addition of an aluminum sulphate solution. The precipitation is filtered of, washed, dried at 105° C. and ground fine on a suitable grinder. 2320 g. of a white, soft powder is obtained.

If 5% of the agent is mixed into the acid hardening lacquer described in Example 1, then one will obtain a dull lacquer with excellent qualities. The degree of lustre this time amounts to 9%. After a storage time of 8 weeks, only a few ml. of an easily stirrable precipitate develops.

EXAMPLE 4

For precipitation, 67.5 liters of hot water and 10.48 liters of sodium silicate (density, 1.17 g/cm³: modulus: SiO₂: Na₂O = 3.30) were heated to 82.5° C. while stirring. Into the alkaline initial precipitate are added, during a ninety minute period, sodium silicate (density 1.35 g/cm³, (Modul) Na₂O:SiO₂ = 1:3.30) at a rate of 11 liters per hour, and 55.5% sulfuric acid (density 1.45 g/cm³) at the rate of 1.9 liters per hour, while stirring and dispersing the mixture.

During this reaction phase, the contents of the container were pumped thirty times through the dispergator. After that, the silicic acid suspension was adjusted to a pH value of 3.5 with 55.5% sulfuric acid (density: 1.45 g/cm³), which was accomplished by means of a 35 minute influx of acid at a rate of 2.5 liters/hour.

A 20% emulsion of a synthetic polyethylene wax (PAD 521), stored intermediately in a supply tank, was made according to the following recipe:

| | |
|---|---|
| PAD wax 521 | 20% by weight) melt |
| Genapol-S-150* | 1% by weight) |
| Arkopal N-090 nonylphenol polyglycolether | 4% by weight) |
| KOH solution | 1.4% by weight) initial |
| Water | 73.6% by weight) |

*See page 2328 Rompps-Chimie-Lexicon 6 (Chem. Dictionary) 1966 Frankh'sche Verlagsanstaldt Stuttgart.

1.3 liters of this 20% wax emulsion were added to the original suspension during a period of 15–20 minutes while stirring. The modified silicic acid, ground on a finest impact pulverizer, had the following characteristics:

| | |
|---|---|
| Chemical Analysis: | |
| C - contents: | 2.3% by weight |
| wax contents: | 2.7% by weight |
| loss on ignition | 11.4% by weight |
| water contents: | 8.7% by weight |
| SO₄⁻² - contents: | traces |
| Physical Properties: | |
| pH value in 4% aqueous suspension: | 5.70 |
| density at 25° C. | 2.00 g/cm³ |
| bulk weight | 54 g/l |
| grain distribution | 32.9% by weight <2.2 μ |
| | 68.0% by weight <3.5 μ |
| | 97.7% by weight <7.1 μ |
| | 100% by weight <14.8 μ |

EXAMPLE 5

For precipitation, 67,5 liters of hot water, 3 liters of a 20% PAD Wax 521 emulsion, and 10.48 liters of sodium silicate (density: 1.17 g/cm³, modulus: SiO₂: Na₂O = 3.30) were heated while stirring.

During the following 90 minutes, sodium silicate (density: 1.35 g/cm³; modulus: SiO₂: Na₂O = 3.30) was added at the rate of 1.9 liters/hour to the alkaline initial precipitate while stirring and dispersing (with a dispergator pump of the type Dispax-Reactor 6/3/3). During this reaction phase, the precipitation suspension passed 30 times through the dispergator pump.

The wax-silicic acid suspension was finally adjusted to a pH value of 3.5 with 55.5% sulfuric acid (density 1.45 g/cm³) which was accomplished by means of a 35 minute influx of acid at a rate of 2.5 liters/hour while the mixture was stirred and dispersed.

The washed filter cake was dried for 12 hours at 110°–120° C and subsequently ground in a suitable classification grinder.

The wax-impregnated precipitation product represented a very finely dispersed, white, freely flowing powder, which could be characterized as follows:

| | |
|---|---|
| Chemical Analysis: | |
| C - content: | 5.98% by weight |
| Wax content: | 7.0% by weight |
| Loss on ignition: (1000° C) | 16.4% by weight |
| Water content: | 9.4% by weight |
| SO₄⁻² content: | traces |
| Physical Properties: | |
| pH value in 4% aqueous suspension: 5.20 | |
| Density at 25° C | 1.90 g/cm³ |
| Bulk weight: | 80 g/l. |
| Grain distribution (Bahco analysis) | |
| | 69.4% by weight <2.3 μ |
| | 96.3% by weight <3.6 μ |
| | 99.9% by weight <7.4 μ |

EXAMPLE 6

A modified silicic acid is produced in the manner set forth in Example 5. The only difference is the treatment of the precipitation suspension, which in this case is made without the use of the dispergator. The modified silicic acid obtained has the following characteristics:

| | |
|---|---|
| Chemical Analysis: | |
| C - content: | 5.85% by weight |
| Wax content | 6.8% by weight |
| Loss on ignition | 16.6% by weight |
| Water content: | 9.8% by weight |
| SO₄⁻² content | 0.14% by weight |
| Physical Properties: | |
| pH value in 4% aqueous suspension: | 5.60 |
| Density at 25° C | 1.85 g/cm³ |
| Bulk weight: | 58 g/l |
| Grain distribution (Bahco analysis): | |
| | 36.7 % by weight <2.3 μ |
| | 90.6% by weight <3.6 μ |
| | 99.5 % by weight <7.4 μ |
| | 100% by weight <15.4 μ |

EXAMPLE 7

The production of the precipitation modified dulling silicic acid was done in the same manner as set forth in Example 6. Instead of the quantity of wax emulsion of 3 liters used in Example 6, only 1.6 liters of this emulsion were added to the initial material. The silicic acid powder had the following characteristics:

| | |
|---|---|
| Chemical Analysis: | |
| C - content | 3.40% by weight |
| Wax content | about 4.0% by weight |
| Loss on ignition | 13.2% by weight |
| Water content | 9.2% by weight |
| SO₄⁻² content | traces |
| Physical Properties: | |
| pH value in 4% aqueous suspension: | 5.70 |
| Density at 25° C: | 1.94 g/cm³ |
| Bulk weight | 57 g/l. |
| Grain distribution (Bahco analysis): | |
| | 34.4% by weight < 2.2 μ |
| | 73.0% by weight < 3.5 μ |
| | 98.3% by weight < 7.3 μ |
| | 100% by weight < 15.1 μ |

EXAMPLE 8

For the production of a wax modified dulling silicic acid, the same procedure was followed as in Example 4.

However, a part of the wax emulsion used, to wit 0.86 liter, was added to the initial substance, so that a precipitation modified silicic acid suspension developed which, after acid adjustment, was treated with an additional 2.14 liters of wax emulsion in the course of 15-20 minutes, while stirring. The silicic acid obtained in accordance with this example was produced without the use of a dispergator.

| Chemical Analysis: | |
| --- | --- |
| C content: | 5.94% by weight |
| Wax content: | 6.90% by weight |
| Loss on ignition: | 16.40 by weight |
| $SO_4^{-2}$ content: | traces |
| Physical Properties: | |
| pH value in 4% aqueous suspension: | 5.60 |
| Density at 25° C: | 1.89 g/cm$^3$ |
| Bulk weight: | 60 g/l. |
| Grain distribution: | |
| | 28.4% by weight <2.3 μ |
| | 73.9% by weight <3.6 μ |
| | 98.4% by weight <7.3 μ |
| | 99.9% by weight <15.3 μ |

From the foregoing examples it will be seen that the particle size distribution for the silicic acid produced in accordance with the invention is as follows:
 at least 28.4% less than 2.3 microns,
 at least 68% less than 3.5 microns,
 at least 97.7% less than 7.1 microns.

More particularly, from the foregoing it will be apparent that the particle size distribution for the silicic acid may be in the range of weight proportions as follows:
 28.4 to 69.4% < 2.3 μ
 68.0 to 96.3% < 3.6 μ
 97.5 to 99.5% < 7.4 μ
 99.9 to 100% < 1.5 μ

In Table I, infra, the deposit characteristics of the dulling agents produced according to the invention and in accordance with Examples 4 – 8 have been summarized in comparison with other commercial dulling agents on an SiO$_2$ basis. The test of the deposit behavior took place in two test lacquers considered particularly critical—an acid-hardening (SH—) lacquer and a nitrocombination lacquer (N-C lacquer), whose recipes follow:

| Acid-Hardening Lacquer: | |
| --- | --- |
| Urea-formaldehyde resin ("Plastopal BT") (60% in n-butanol) | 39.6% |
| Xylene | 30.2% |
| Ethylene glycol | 15.1% |
| Ethanol | 15.1% |

For the test, the lacquer was used without hardening acid addition. The quantity of dulling agent worked into the lacquer amounted to 2.5% by weight.

| Nitro-Combination Lacquer: | Parts by Weight |
| --- | --- |
| Nitrocellulose ("Wool E 510") moist with butanol | 120 |
| Toluene | 120 |
| Ethyl acetate | 80 |
| Butyl acetate, 85% | 80 |
| n-Butanol | 40 |
| Maleic resin ("Alresat 219C") solution 50% eithyl and butyl acetate | 160 |
| Benzene 100-140 | 80 |
| Modified oil alkyd resin "Jaegalyd E42" 60% in xylene | 80 |
| Dibutyl phthalate | 24 |
| Castor oil 18 P | 16 |

| Nitro-Combination Lacquer: | Parts by Weight |
| --- | --- |
| -continued | |
| | 860 |

The quantity of dulling agent worked into the lacquer amounted to 1% by weight.

In order to work it into the test lacquer, 40 g. of the lacquer and the corresponding quantity of dulling agent were dispersed for eight minutes with a propeller stirrer rotating at 2000 rpm. The mixture for the lacquer test was kept in a closed container. The sedimentation behavior or the nature of the deposit on the bottom of a small 50 ml. flask was checked at intervals of 10, 52, and 136 days. To check the character of the deposits which settled at the bottom of the flask containing the test lacquer, the samll flask was turned upside down (agitation test). Each flask was given a rating of from 1 to 4, depending on the behavior of the deposits, based on the following observations:

1 = very good = Complete running off and dispersion of the deposit upon turning the bottle over once.
 2 = good = Substantial running off and dispersion of the deposit upon turning the bottle over once. Traces adhere to the bottom, but these are easily dispersible upon truning the bottle over 2 - 3 times.
 3 = satisfactory = The deposit still can be dispersed through repeated turning over of the bottle.
 4 = bad = Hard deposit, which can no longer be dispersed, or can be dispersed only with difficulty.

TABLE I

Sedimentation Characteristics of Modified/Non-Modified Silicic Acids in the Two Test Lacquers

| Dulling Agent | Quantity of Wax related to dried silicic acid (% of weight) | Acid Hardening Lacquer (SH) | | | Nitro Combination Lacquer | | |
| --- | --- | --- | --- | --- | --- | --- | --- |
| | | Evaluation of nature of the deposit on the bottom after a storage time of days: | | | | | |
| | | 10 | 52 | 136 | 10 | 52 | 136 |
| Commercial SiO$_2$, Xerogel | 0 | 4 | 4 | 4 | 4 | 4 | 4 |
| Wax modified SiO$_2$ acc. to prior art | 15 | 1 | 2 | 3 | 1 | 2 | 3 |
| Modified SiO$_2$ acc. to Example 5 | 7 | 1 | 1 | 1 | 2 | 2 | 3 |
| Modified SiO$_2$ acc. to Example 6 | 7 | 1 | 1 | 2 | 1 | 2 | 2 |
| Modified SiO$_2$ acc. to Example 7 | 4 | 1 | 1 | 1 | 2 | 2 | 2 |
| Modified SiO$_2$ acc. to Example 4 | 3 | 1 | 1 | 2 | 2 | 2 | 3 |
| Modified SiO$_2$ acc. to Example 8 | 7 | 1 | 1 | 1 | 2 | 2 | 2 |

Key:
1 = very good
2 = good
3 = satisfactory
4 = bad

As can be gathered from Table I, the dulling material produced according to the invention can easily be redispersed through slight shaking of the test lacquer by hand, even after long storage times. In the SH lacquer, it is superior even to the wax-modified dulling agent produced according to the status of the prior art. Non-modified silicic acids settle in a hard cake and cannot be dispersed again. As one can see from Table I, furthermore, these favorable sedimentation characteristics can be achieved on the basis of the new improved process of impregnation even with relatively small quantities of wax, which makes the process an economic one. Beyond that, the clearly smaller quantity of wax increased the hardness and scratch-resistance of the films of lacquer, so that the dulling silicic acids according to the invention are superior to the ones synthesized in accordance with the status of the prior art.

The following comparative experiments show the favorable characteristics in use of the dulling silicic acids obtained according to Example 4 – 8 in four test lacquer recipes, and contrast them to the corresponding characteristics of silicic acids made according to the status of the prior art. The data have been summarized in Table II.

The gloss meter according to B. Lange, which is frequently used in Germany, is used for the determination of degree of lustre, which represents a measure for the delustering power of dulling silicic acid tested. The Lange gloss meter uses an angle of 45° as an angle of incidence and reflection. The measured degrees of lustre are stated in percent. The smaller their value, the better will be the delustering capacity of the silicic acid tested, or, in other words, less dulling agent will need be used in order to achieve a certain degree of lustre.

The determination of "grindometric" value is made with the help of a "grindometer." The grindometric value, which is measured in $\mu$ (micron), is a measure for the coarsest particles which occur in the finished, sprayable lacquer mixture after the dulling silicic acid has been stirred in. It can be brought into a relationship with the formation of spots in the dry film of lacquer. The feared and undesirable "spraying grain" (Spritzkorn) can be spotted with the help of the grindometer.

It is to be noted that the so-called grindometer value presents the state of the dispersed silicic acid pigment in the lacquer film. Insofar as the secondary agglomerates of the silicic acid pigment are sufficiently stable, and insofar as protective methods of working it in (stirring in) are used, a connection exists between the minimum grain size and the grindometer value: low minimum grain values also mean low grindometer values. The fact, that the matting silicic acids according to the invention have very low minimum grain values of 10 $\mu$ (corresponding grindometer values of 28 $\mu$ ± 2 $\mu$), makes it possible to achieve surfaces of lacquer film of the highest quality even in the case of exceedingly thin lacquer film thicknesses.

The matting effect on the other hand is influenced unequivocally by the secondary particle distribution. Although this does not represent the only value of influence, the grain spectrum according to the Bahco analysis shows the following picture:

~ 70% by weight < 2.3 $\mu$
96% by weight < 3.6 $\mu$
99% by weight < 7.4 $\mu$

In regard to the grain analytical description of the matting silicic acid one should thus say:

"Silicic acid with a secondary minimum grain size of 10 u and a secondary particle distribution according to 70% by weight <2.3 $\mu$ to 96% by weight < 3.6 $\mu$ and 99% by weight <7.4 $\mu$, are suitable for matting of lacquer systems in which they have grindometer values of 28 ± 2 $\mu$."

All the grindometer measurements shown in Table II were made in black enamel lacquer, which was sprayed in a thickness of about 35 $\mu$ per layer. The compositions of the four lacquers in which the dulling capacity of the silicic acids of the invention were tested are given below:

A) Black alkyd resin enamel lacquer

The following were mixed into a paste on the triple roller:
- 450 parts of oil alkyd resin ("Alkydal ST") (75% in xylene)
- 1.8 parts of soya lecithin
- 80 parts of n-butanol
- 90 parts of color soot, F W 2
- 621.8 parts

- 413 parts of the above paste
- 2540 parts of oil alkyd resin ("Alkydal ST") (75% in xylene)
- 600 parts of melamine resin ("Maprenal WP") (55%)
- 87 parts of n-butanol
- 120 parts of ethylene glycol
- 400 parts of toluene
- 740 parts of xylene
- 100 parts of glycol acid butyl ester ("GB-ester")
- 100 parts of butyl acetate
- 100 parts of silicon oil (OL) (10% in toluene)
- 5200 parts The mixture was adjusted with xylene to a viscosity of 23 seconds (Ford viscosimeter, DIN-4-mm-nozzle). 5 g. of dulling agent per 100 g. of lacquer were stirred in with the propeller stirrer rotating at 2000 rpm for 8 minutes. After spraying at layer thickness of 35 $\mu$, the lacquer was baked for 30 minutes at 180° C.

B) Polyamide resin lacquer - (DD lacquer)

- 300 parts of polyamide resin alcohol component ("Desmophen 800")
- 400 parts of polyamide/resin/alcohol component ("Desmophen 1100")
- 2 parts of silicon oil (OL) (10% in toluene)
- 60 parts of polyvinyl acetate resin ("Mowilith 20") (50% in ethyl acetate)
- 6 parts of acetyl cellulose ("Cellit BP 700")
- 200 parts of butyl acetate (98%)
- 140 parts of methyl glycol acetate
- 200 parts of ethyl glycol acetate
- 592 parts of "Shellsol A"
- 100 parts of methoxy butyl acetate ("Butoxyl")
- 2000 parts 100 g. of the above lacquer mixture were adjusted with 50 g. of the polyamide resin isocyanate component (Desmodur) (75%), 10,8 g. of dulling agent, and DD-thinner, to a viscosity of 18 seconds. This mixture was mixed for 8 minutes with the impeller rotating at 2000 rpm. The lacquer was applied to form a layer of thickness of 30 – 40 $\mu$.

C) Polyester resin lacquer (UPE lacquer)

- 1040 parts of polyester resin ("Roskydal 500B")
- 260 parts of polyester resin ("Roskydal 500")
- 64 parts of silicon oil (OL) (1% in toluene)
- 572 parts of monostyrene
- 1936 parts 96.8 g. of the above lacquer mixture, 3.2 g. of accelerator (Co-Naphtenat 10% in toluene), 6.5 g. of dulling agent, and 10 g. of hardener (organic peroxice AP/20% in ethyl acetate) were brought to a viscosity of 20 seconds with the help of ethyl acetate, and dispersed for 8 minutes with an impeller rotating at 2000 rpm. The lacquer was sprayed to form a layer having a thickness of 80 – 100 $\mu$.

D) Acid hardening alkyd resin lacquer, (SH-lacquer)

- 760 parts of oil alkyd resin ("Alkydal R 40") (60% in xylene)
- 840 parts of melamine resin ("Maprenal SHL eNP")

-continued

D) Acid hardening alkyd resin lacquer, (SH-lacquer)

(55% in n-butanol)
140 parts of n-butanol
180 parts of ethanol
80 parts of silicon oil (OL) (1% in toluene)

2000 parts 100 g. of the above lacquer composition and 9.6 g. of dulling agent were adjusted with ethanol to a viscosity of 21 seconds and mixed for 8 minutes with the impeller rotating at 2000 rpm. 1 g. of 14% hydrochloric acid per 100 g. lacquer were adjusted with ethanol to a viscosity of 2 seconds. The lacquer was applied in layers having a thickness of 30 – 40 μ.

As can be gathered from Table II, the four described test lacquers containing the dulling silicic acids of Examples 4 – 8 according to the invention, without exception have lower degrees of lustre than the known wax-modified types of silica gel. Thus the dulling (delustering) capacity increases in one case (acid hardening lacquer, Example 5) almost threefold, and in several other cases it increases twofold. The values for the degree of luster in these cases came out particularly favorable in the SH lacquer, UPE lacquer, and the black enamel laquer.

The grindometric values of the dulling silicic acids according to the invention, in comparison with those produced by conventional methods, are likewise lower, which must be regarded as proof of the outstanding surface quality of the lacquer films. In this respect we wish to point out particularly the silicic acid produced according to Example 5. The particle size distribution is 69.4% less than 2.3 microns, 96.3% less than 3.6 microns and 99.9% less than 7.4 microns.

TABLE II

Degrees of Lustre and Grindometric Values of Wax-Modified Dulling Silicic Acids in Various Test Lacquer Recipes

| Dulling Silicic Acid | Values of Degrees of Lustre According to Lange Reflection Measurement below 45° (%) | | | SH Lacquer | Grindometric Value in Black Enamel (μ) |
|---|---|---|---|---|---|
| | Black Enamel | DD Lacquer | UPE Lacquer | | |
| Wax-Modified dulling silicic acid accord. to prior art | 7.0 | 60.0 | 64.0 | 10.0 | 37 |
| Dulling silicic acid accord. to Example 5 | 5.5 | 49.5 | 39.0 | 3.5 | 29 |
| Dulling silicic acid accord. to Example 6 | 5.0 | 46.0 | 42.0 | 6.0 | 35 |
| Dulling silicic acid accord. to Example 7 | 4.5 | 31 | 26 | 5.5 | 34 |
| Dulling silicic acid accord. to Example 4 | 5.5 | 38.5 | 30 | 5.5 | 32 |
| Dulling silicic acid accord. to Example 8 | 4.5 | 36.0 | 31.5 | 5.5 | 35 |

We claim:
1. A lacquer composition comprising from about 2 to 5% by weight of wax-impregnated silicic acid or silicate wherein said wax is the only additive for impregnating said silicic acid or silicate and wherein said wax is present in an amount of about 2 to 7% by weight of the wax impregnated 1 microns in size with a particle size distribution such that at least 28.4% by weight are less 2.3 microns at least 68% by weight are less than 3.5 microns and at least 97.7% by weight are less than 7.1 microns, whereby the wax impregnated silicic acid or silicate particles produces a delustered lacquer film smooth surface and of high scratch resistance.

2. A lacquer composition as defined in claim 1 wherein the particle size distribution of the silicic acid or silicate is
28.4 to 69.4% < 2.3 microns
68.0 to 96.3% < 3.6 microns
97.5 to 99.5% < 7.4 microns
99.9 to 100% < 15 microns 3. A lacquer composition as defined in claim 1 wherein the particle size distribution of the silicic acid or silicate is such at 69.4% by weight are less than 2.3 microns, 96.3 by weight are less than 3.6 microns and 99% by weight are less than 7.4 microns.

4. A surface having a layer of lacquer of a thickness of about 30 microns or less applied thereto, said lacquers being of a composition as defined in claim 1, said surface having a delustered appearance.

* * * * *